(12) United States Patent
Johnson

(10) Patent No.: US 10,291,004 B2
(45) Date of Patent: May 14, 2019

(54) ELECTRICAL AUXILIARY TROUGH

(71) Applicant: Wellesley C. Johnson, Los Angeles, CA (US)

(72) Inventor: Wellesley C. Johnson, Los Angeles, CA (US)

( * ) Notice: Subject to any disclaimer, the term of this patent is extended or adjusted under 35 U.S.C. 154(b) by 0 days.

(21) Appl. No.: 15/488,314

(22) Filed: Apr. 14, 2017

(65) Prior Publication Data
US 2018/0301881 A1 Oct. 18, 2018

(51) Int. Cl.
*H02G 3/04* (2006.01)
*F16L 3/10* (2006.01)
*H02G 9/04* (2006.01)

(52) U.S. Cl.
CPC .............. *H02G 3/0456* (2013.01); *F16L 3/10* (2013.01); *H02G 3/0418* (2013.01); *H02G 3/0487* (2013.01); *H02G 9/04* (2013.01)

(58) Field of Classification Search
CPC ...... H02G 3/0456; H02G 3/0418; H02G 3/22; H02G 3/30; F16L 3/10
See application file for complete search history.

(56) References Cited

U.S. PATENT DOCUMENTS

| | | | | |
|---|---|---|---|---|
| 4,534,147 A * | 8/1985 | Cristell | ............... | H02G 3/0431 174/491 |
| 4,629,826 A * | 12/1986 | Thomas | ............... | H02G 3/0431 138/108 |
| 4,727,815 A * | 3/1988 | Miller | ............... | F16B 12/46 108/42 |
| 5,383,318 A * | 1/1995 | Kelley | ............... | H02G 3/0418 248/49 |
| 7,408,113 B2 * | 8/2008 | Caveney | ............... | H02G 3/0418 174/480 |
| 9,178,342 B2 * | 11/2015 | Rodenberg | ............ | H02G 3/0418 |
| 2012/0286110 A1 * | 11/2012 | Hill | ............ | F16L 3/13 248/74.2 |

* cited by examiner

*Primary Examiner* — Anita M King
(74) *Attorney, Agent, or Firm* — Inskeep IP Group, Inc.

(57) ABSTRACT

This invention provides a molded means constructed of casted metal. The trough's interior is weather resistant by means of a removable cover, insulation and housing. Preformed holes and thinned concave sections of the housing can be removed to provide a means for the trough to be affixed to a vertex of a substantially ninety degree corner of a structure, a flat surface or a cylindrical object. The trough also has a plurality of connectors to fasten electrical components. This invention is constructed to provide satisfactory volume to meet electrical authority standards. The housing has a plurality of threaded connectors and removable thinned circular sections for attaching conduits and electrical components. The housing has a weatherproof sealing gasket pad with a sticker side to be placed on the back of the housing before mounting to prevent moisture. The front cover has a weatherproof sealing gasket along the inner perimeter to prevent moisture.

15 Claims, 2 Drawing Sheets

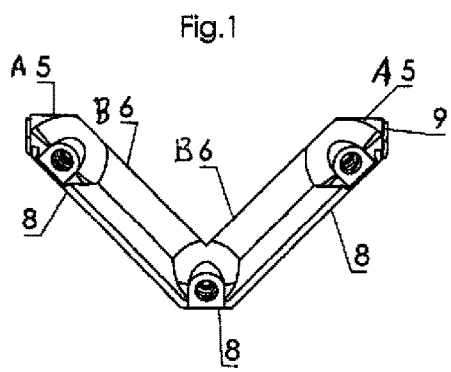
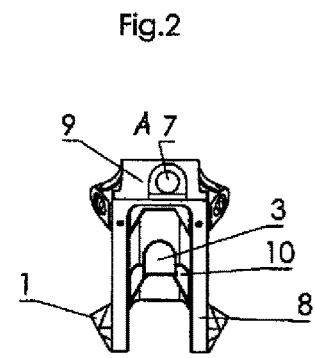
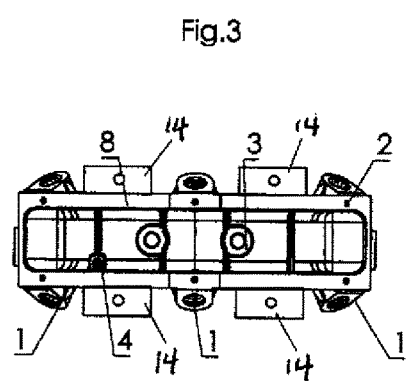
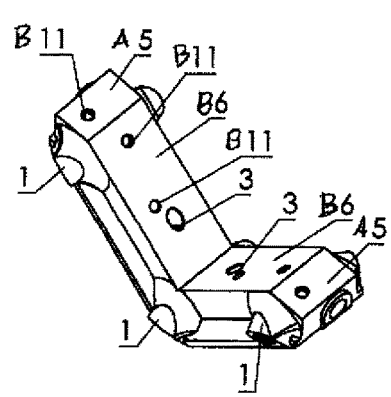
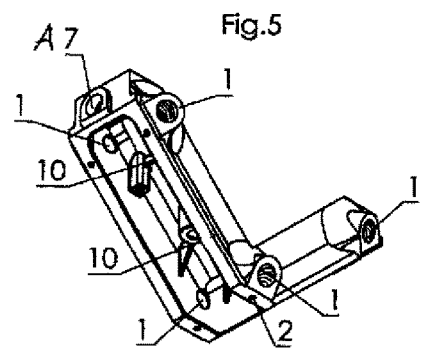

ELECTRICAL AUXILIARY TROUGH

BACKGROUND OF THE INVENTION

1. Field of Invention

This invention relates to an electrical junction trough to serve as mounting and wiring means for lighting fixtures and electrical components.

2. Description of the Related Art

There are many known electrical junction boxes and troughs. However, there is not a single trough with a substantially ninety degree design with a plurality of connectors to support multiple electrical components and that can be affixed universally on the vertex of a substantially ninety degree corner of a structure, a flat surface or a circular pole. There are various junction boxes designed for mounting on flat surfaces only. There are condulets with bodies designed to support conduits and multiple electrical components, but not while simultaneously affixed on the vertex of a ninety degree corner. It will be apparent to those skilled in the art from this disclosure that there exists a need for an improved electrical auxiliary trough. This invention addresses this need in the art as well as other needs, which will become apparent to those skilled in the art from this disclosure.

BRIEF SUMMARY OF THE PRESENT INVENTION

This invention provides a molded electrical auxiliary trough constructed of casted metal. The trough's interior is weather resistant by means of a removable cover, insulation and housing. Preformed holes and thinned concave sections of the housing can be removed to provide a means for the trough to be affixed to a vertex of a substantially ninety degree corner of a structure, a flat surface or a cylindrical object.

This invention is constructed to provide satisfactory volume to meet electrical authority standards. The housing has a plurality of threaded connectors and removable thinned circular sections for attaching conduits and electrical components. The housing has a weatherproof sealing gasket pad with a sticker side to be placed on the back of the housing before mounting to prevent moisture. The front cover has a weatherproof sealing gasket along the inner perimeter to prevent moisture.

DESCRIPTION OF THE SEVERAL VIEWS OF THE DRAWINGS

Other features and advantages of this invention will become apparent in the following detailed description of the preferred embodiments of this invention with reference to the accompanying drawings in which:

FIG. 1 is a top view of the trough, showing its substantially ninety degree design and the various angled threaded inlet connectors.

FIG. 2 is a side view displaying a circular concave section, and an extruded mounting connector for mounting the trough to a cylindrical object via u-bolt.

FIG. 3 is a front view displaying extruded mounting connectors and flanges.

FIG. 4 is an isometric view displaying circular concave sections on the rear portions for mounting the trough. FIG. 4 also shows the threaded connector inlets of the trough.

FIG. 5 is an isometric view displaying several interior portions of the trough. FIG. 5 also shows the inner portion of the threaded connectors and several ribbed portions for additional tensile strength.

Figure 6:
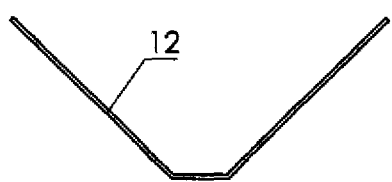
FIG. 6 is a side view of the cover that encapsulates the troughs trough's housing.

| REFERENCE NUMERALS IN THE DRAWINGS | | | |
|---|---|---|---|
| 1 | Threaded connector inlets | 2 | Fastening holes |
| 3 | Extruded connectors | 4 | Ground terminal |
| A5 | Rear portions | B6 | Rear portions |
| A7 | Circular concave section | 8 | Front portions |
| 9 | Side portions | 10 | Ribbed portions |
| B11 | Circular concave section | 12 | Cover |
| 13 | Insulator | 14 | Flanges |

DETAILED DESCRIPTION

Selected embodiments of the present invention will now be explained with reference to the drawings. It will be apparent to those skilled in the art from this disclosure that the following description of the embodiments of the present invention are provided for illustration only and not for the purpose of limiting the invention as defined by the appended claims and their equivalents.

Figure 7:
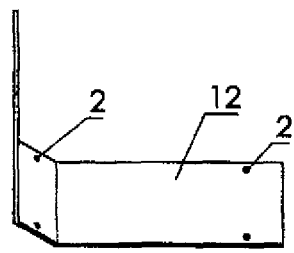
FIG. 7 is a front view of the cover displaying several holes for fastening.
Figure 8:
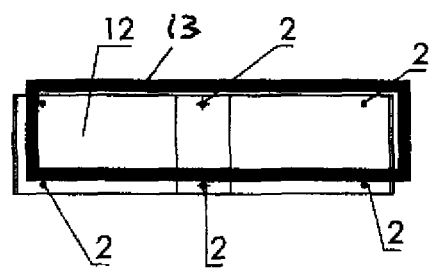
FIG. 8 is a isometric view of the cover and insulator.
Figure 9:
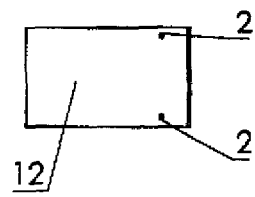
FIG. 9 is a top view of the cover.

Referring initially to FIG. 1 an electrical auxiliary trough with a substantially ninety degree design. The trough is equipped with various connective options such as the angled threaded connector inlets 1 formed into the housing. The threaded connector inlets 1 serve as connections for conduits, lighting fixtures, and various electrical components. FIG. 4 shows rear portions A5, and rear portions B6. Rear portions A5 enable the trough to be affixed to a flat surface such as a wall or ceiling via removing circular concave sections B11. In FIG. 3 there are two extruded connectors 3 for securing the rear portions B6 of the trough to a pole with a cylindrical shape via u-bolt. Also in FIG. 3 there are flanges 14 that can be used to mount the trough to a wall. In FIG. 4 the removable circular concave sections B11 are located on the rear portions A5 and rear portions B6 for securement to a structure of linear proportions by removing circular concave sections B11 in which fastening hardware can be secured. Rear portions B6 also enable the trough to be affixed to a substantially ninety degree corner of a wall, object or structure by removing circular concave sections B11 allowing fastening hardware to be inserted. In FIG. 3 the front portions 8 of the trough have several threaded fastening holes 2 for encapsulating the trough with an insulator 13 in FIG. 8 and the cover 12 in FIG. 7. FIG. 5 displays ribbed portions 10 formed into the housing for additional tensile strength. The trough can be grounded via ground terminal 4 in FIG. 3. In FIG. 2 and FIG. 5 there are views of removable circular concave sections A7 for additional connection of conduits and electrical components.

What is claimed is:
1. An electrical auxiliary trough comprising;
a substantially ninety degree shaped housing having a front portion and side portions and rear portions, wherein said rear portions can be universally affixed to a flat surface and or a cylindrical pole and or affixed on a corner surface of a substantially ninety degrees wall;

a plurality of threaded connectors orientated at various angles and formed to said housing for securement of conduit(s) and or electrical devices;

circular concave sections and threaded sections of the side portions and rear portions of said housing for securement of electrical components;

a detachable cover creating a weather resistant seal encasing said housing;

a gasket insulator supported on the cover and the front of said housing to create weather resistant barrier;

means for fastening rear sections of said housing to an object and or structure; and means for electrically connecting said housing to conductors and electrical components.

2. The electrical auxiliary trough in claim 1 wherein the means for fastening rear portions of said housing to an object and or structure comprises thinned circular concave sections on the rear portions of said housing which can be removed therefore providing hole(s) to allow hardware to be fastened and holes formed on rear portions of said housing to allow hardware to be fastened.

3. The electrical auxiliary trough in claim 1 wherein said plurality of threaded connectors orientated at various angles and formed to said housing, said threaded connectors are slightly angled away from rear portions allowing ease of installations of electrical components while said trough is affixed to an object or structure.

4. The electrical auxiliary trough in claim 1 wherein the means for electrically connecting said housing to conductors and electrical components comprises threaded connectors for conduit insertion, and thinned circular concave sections of said housing which are removed for conduit insertion and at least one grounding terminal with screw for landing a ground wire.

5. The electrical auxiliary trough in claim 1 wherein said gasket insulator supported on the cover and the front of said housing to create weather resistant barrier, the gasket insulator is made of rubber, foam or fiber and has a sticker side which forms a gasket between the perimeter of said housing and cover.

6. The electrical auxiliary trough in claim 1 wherein said side and rear portions have flanges with holes for universally mounting said housing to said flat surface and or said cylindrical pole and or said corner surface of substantially ninety degrees wall.

7. An electrical auxiliary trough comprising;

a detachable cover creating a weather resistant seal by encasing a housing, said detachable cover is constructed of metal with holes near an outer edge which allows fastening by use of screws;

said housing is constructed of metal with countersink threaded holes on a front portion for fastening said cover;

wherein said detachable cover is configured to conform to a substantially ninety-degree shape of said housing;

wherein said electrical auxiliary trough further comprising a gasket insulator supported on said detachable cover and the front of said housing to create weather resistant barrier.

8. The electrical auxiliary trough of claim 7 further comprising said housing having the front portion and side portions and rear portions, wherein said rear portions can be universally affixed to a flat surface and or a cylindrical pole and or affixed on a corner surface of a substantially ninety degrees wall.

9. The electrical auxiliary trough of claim 7 further comprising a plurality of threaded connectors which are formed to said housing and positioned at various angles and circular concave sections and threaded sections formed at the side portions and rear portions of said housing for securement of electrical components, conduit(s) and or electrical devices.

10. The electrical auxiliary trough of claim 9 wherein said plurality of threaded connectors are slightly angled away from rear portions allowing ease of installations of electrical components while said trough is affixed to an object or structure.

11. The electrical auxiliary trough of claim 7 wherein said gasket insulator is made of rubber, foam or fiber and has a sticker side which forms a gasket between the perimeter of said housing and cover.

12. The electrical auxiliary trough of claim 7 further comprising means for fastening rear sections of said housing to an object and or structure; and means for electrically connecting said housing to conductors and electrical components.

13. The electrical auxiliary trough of claim 12 further comprising thinned circular concave sections on the rear portions of said housing which can be removed therefore providing hole(s) to allow hardware to be fastened and holes formed on rear portions of said housing to allow hardware to be fastened.

14. The electrical auxiliary trough of claim 12 wherein the means for electrically connecting said housing to conductors and electrical components comprises threaded connectors for conduit insertion, and thinned circular concave sections of said housing which are removed for conduit insertion and at least one grounding terminal with screw for landing a ground wire.

15. The electrical auxiliary trough of claim 8 wherein said side and rear portions have flanges with holes for universally mounting said housing to said flat surface and or said cylindrical pole and or said corner surface of substantially ninety degrees wall.

* * * * *